(12) United States Patent
Früh et al.

(10) Patent No.: US 6,929,759 B2
(45) Date of Patent: Aug. 16, 2005

(54) COMPOSITION OF MATTER AND ITS USE AS A COAGULANT AND FLOCCULENT

(75) Inventors: Herbert Früh, Bonstetten (CH); Ulrich Brunner, Zürich (CH); André Thum, Stafä (CH)

(73) Assignee: CU Chemie Uetikon AG, Uetikon am See (CH)

( * ) Notice: Subject to any disclaimer, the term of this patent is extended or adjusted under 35 U.S.C. 154(b) by 0 days.

(21) Appl. No.: 10/808,705

(22) Filed: Mar. 23, 2004

(65) Prior Publication Data

US 2004/0195184 A1 Oct. 7, 2004

Related U.S. Application Data

(63) Continuation of application No. PCT/EP02/10697, filed on Sep. 24, 2002.

(30) Foreign Application Priority Data

Sep. 27, 2001 (DE) .......................... 101 47 658

(51) Int. Cl.⁷ ................................. C02F 1/56

(52) U.S. Cl. ........................ 252/181; 210/728
(58) Field of Search ................. 210/716, 725, 210/728, 735, 736; 252/175, 180, 181

(56) References Cited

U.S. PATENT DOCUMENTS

| 3,953,330 A | * | 4/1976 | Tonkyn et al. | 210/728 |
| 4,067,806 A | * | 1/1978 | Mauceri | 210/728 |
| 4,362,643 A | * | 12/1982 | Kuo et al. | 252/175 |
| 4,588,508 A | * | 5/1986 | Allenson et al. | 210/708 |
| 4,655,934 A | * | 4/1987 | Rose et al. | 210/728 |
| 4,769,155 A | * | 9/1988 | Dwyer | 210/728 |
| 4,902,779 A | * | 2/1990 | Waldmann | 528/422 |
| 6,120,690 A | * | 9/2000 | Haase | 210/728 |

* cited by examiner

*Primary Examiner*—Peter A. Hruskoci
(74) *Attorney, Agent, or Firm*—Alix, Yale & Ristas, LLP (57) ABSTRACT

The present invention in a preferred form is a novel composition of matter and a method of use, which includes at least a polyaluminum compound in an aqueous solution for use as a coagulant and/or flocculant. The composition of matter additionally includes magnesium and/or calcium and a water-soluble polymeric flocculant.

12 Claims, 5 Drawing Sheets

| Component | Example 1 | Example 2 | Example 3 | Example 4 |
|---|---|---|---|---|
| [A] Alpoclar 200 | 81 g | 81 g | 81 g | 81 g |
| [B] Magnesium chloride solution (23%) | 15 g | 15 g | 15 g | 15 g |
| [C1] Polyamine CO 501 | 1.33 g | 4.0 g | – | 1.0 g |
| [C2] Polyamine CO 502 | 1.33 g | – | 4.0 g | 1.0 g. |
| [C3] PolyDADMAC CO 509 | 1.33 g | – | – | 2.0 g |

Figure 1

| Component | Example 1 | Example 2 | Example 3 | Example 4 |
|---|---|---|---|---|
| [A] Alpoclar 200 | 81 g | 81 g | 81 g | 81 g |
| [B] Magnesium chloride solution (23%) | 15 g | 15 g | 15 g | 15 g |
| [C1] Polyamine CO 501 | 1.33 g | 4.0 g | – | 1.0 g |
| [C2] Polyamine CO 502 | 1.33 g | – | 4.0 g | 1.0 g |
| [C3] PolyDADMAC CO 509 | 1.33 g | – | – | 2.0 g |

Figure 2

| Component | Active Ingredient | Example 1 | Example 2 | Example 3 | Example 4 |
|---|---|---|---|---|---|
| [A] Alpoclar 200 | Al | 7.70 g | 7.70 g | 7.70 g | 7.70 g |
| [B] Magnesium chloride solution | Mg | 0.83 g | 0.83 g | 0.83 g | 0.83 g |
| [C1] Polyamine CO 501 | Polyamine | 0.53 g | 1.60 g | – | 0.40 g |
| [C2] Polyamine CO 502 | Polyamine | 0.66 g | – | 1.99 g | 0.50 g |
| [C3] PolyDADMAC CO 509 | PolyDADMAC | 0.53 g | – | – | 0.80 g |

Figure 3

| Eglisau Wastewater Treatment Plant | | August–November | | | |
|---|---|---|---|---|---|
| | | 1998 % purification | | 2000 % purification | |
| Hydraulic input   biology feed | m³ | 232.360 | | 221.972 | |
| Input BOD$_5$ | kg | 54.325 | | 53.167 | |
| Input ammonium - N | kg | 2.702 | | 3.502 | |
| Input phosphorus total | kg | 812 | | 967 | |
| Total undissolved substances | kg | 949 | | 937 | |
| Elimination of BOD$_5$ | kg | 53.068 | 98 | 52.635 | 99 |
| Elimination of ammonium - N | kg | 2.675 | 97 | 3.488 | 99 |
| Elimination of phosphorus total | kg | 739 | 91 | 740 | 76 |
| Fe precipitating/flocculating agent | kg | 15.860 | | 0 | |
| Test product (Example 2) | kg | 0 | | 6.107 | |
| Product per m³ of water to be purified | g | 68 | | 28 | |

Figure 4

| Bäretswil Wastewater Treatment Plant | | September–November | | | |
|---|---|---|---|---|---|
| | | 1999 % purification | | 2000 % purification | |
| Hydraulic input   biology feed | m³ | 185.907 | | 219.691 | |
| Input BOD$_5$ | kg | 19.044 | | 17.377 | |
| Input ammonium - N | kg | 3.729 | | 3.689 | |
| Input phosphorus total | kg | 564 | | 637 | |
| Total undissolved substances | kg | 1.004 | | 889 | |
| Elimination of BOD$_5$ | kg | 18.222 | 96 | 16.362 | 94 |
| Elimination of ammonium - N | kg | 941 | 25 | 2.790 | 74 |
| Elimination of phosphorus total | kg | 506 | 90 | 568 | 89 |
| Fe/Al precipitating agent | kg | 17.457 | | 0 | |
| Test product (Example 3) | kg | 0 | | 7.542 | |
| Product per m³ of water to be purified | g | 94 | | 34 | |

Figure 5

| Wangen a. d. Aare Wastewater Treatment Plant | | August–October | | | |
|---|---|---|---|---|---|
| | | 1998 % purification | | 2000 % purification | |
| Hydraulic input biology feed | m³ | 457.935 | | 390.490 | |
| Input BOD₅ | kg | 24.433 | | 17.502 | |
| Input COD | | 53.483 | | 36.844 | |
| Input ammonium - N | kg | 3.950 | | 5.215 | |
| Input phosphorus total | kg | 1.032 | | 857 | |
| Elimination of BOD₅ | kg | 23.237 | 94 | 16.509 | 94 |
| Elimination of COD | kg | 46.574 | 87 | 31.092 | 84 |
| Elimination of ammonium - N | kg | 3.783 | 96 | 5.061 | 97 |
| Elimination of phosphorus total | kg | 266 | 25 | 613 | 71 |
| Fe precipitating/flocculating agent | kg | (unknown) | | 0 | |
| Test product (Example 4) | kg | | | 14.280 | |
| Product per m³ of water to be purified | g | (unknown) | | 37 | |

COMPOSITION OF MATTER AND ITS USE AS A COAGULANT AND FLOCCULENT

CROSS REFERENCE TO RELATED APPLICATIONS

This application is a continuation filed under 35 U.S.C. §111(a) of International Application No. PCT/EP02/10697, with an International Filing Date of Sep. 24, 2002.

FIELD OF THE INVENTION

The invention relates generally to the field of water treatment. In particular to compositions of matter intended for use as coagulants and flocculents in wastewater treatment. However, it is not intended that other uses of the composition of matter be excluded.

BACKGROUND OF THE INVENTION

In wastewater treatment plants that have a biological stage, it is important that the substances dissolved in the wastewater be coagulated quantitatively and that they be flocculated in a stable manner along with the particulate substances and the microorganisms that are present. This is necessary to ensure that the sludge flakes sediment out in the subsequent final clarification process and are thereby separated from the purified wastewater, which can be discharged into the environment.

Therefore the goal is that solids, as well as the dissolved carbon, nitrogen, and phosphorus contents, be eliminated from the wastewater. The maximum permissible concentrations of these substances in the discharge of the wastewater treatment plant are defined by government standards. In addition, for the most important substance groups, purification performance expressed in percent—in other words, elimination rates relative to the amount of material fed into the wastewater treatment plant—are specified.

Critical factors in this process are quantitative coagulation, stable flocculation, as well as the rapid sedimentation of the sludge flakes, so that the process continues to occur uninterrupted in a stable manner and so that, as a result, high purification performance is achieved.

Traditionally, iron compounds (iron sulfate and iron chloride) as well as aluminum sulfate, are used as precipitation and flocculation agents in wastewater treatment plants, and in particular also for the elimination of phosphorus. The dose levels are typically in the range of from 50 to 250 ppm (ml per $m^3$ wastewater). These agents make the sludge heavier in order to improve sedimentation, and they also precipitate phosphate chemically. It has been shown that stable long-term operation is theoretically possible. The disadvantages include high consumption of chemicals accompanied by a corresponding load on the sludge that is to be sedimented out and disposed of and the adverse effect on the biological activity of the activated sludge as well as a high sensitivity to load variations and temperature variations in the wastewater treatment plant.

For at least 10 years, precipitating and flocculating agents based on polyaluminum have been present in the market. These agents are oligomeric molecule clusters of $AlCl_3$ and $H_2O$ with a cluster size in the range of approximately 13. They have the advantage of greater effectiveness with lower doses, and they also remain effective at low water temperatures. However, the previously available products based on polyaluminum have problems because of their low storage stability at the user's facility and because of the low stability and reliability of the biological purification process. It is frequently observed that after a plant begins to use a certain polyaluminum precipitating agent for a certain time—for example for some months—the purification operation will suddenly experience poor performance, even amounting all the way to a complete stoppage. Changing to a different product can lead to a temporary recovery, but this recovery does not last.

Document DE 23 34 766 B2 describes the treatment of wastewater containing emulsified substance using a composition of matter that contains aluminum chloride and a macromolecular flocculent, as well as additional silicic acid and silica gel as the absorbent. The flocculent may be a polyamine based compound, which is separated from the wastewater and which has the other components added to it.

In DE 295 093 A5, in order to split oil-in-water emulsions, a pre-cleaving operation is performed with, for example, polyaluminum salts, and a primary cleaving operation is performed with a copolymer of polyacrylonitriles and hydroxylamine. Aluminum chloride is also considered as a cleavage agent, but it is less recommended.

Patent Abstracts of Japan No. 10017857 describes a mixture of chemicals that is "packed" into a water-soluble container, but whose purposes are not precisely stated and that contains, among other things, polyaluminum chloride and a polymeric flocculent.

WO 99/35090 A2 describes a process for preparing a polyaluminum chloride or chloride sulfate flocculent in order to react an aluminum compound with acid aqueous medium containing chloride ions and/or sulfate ions, magnetic substance—and carbonate-containing minerals, and calcium carbonate-containing minerals. The reaction produces a polyaluminum-calcium-magnesium-chloride or chloride sulfate. The composition of matter may also contain a cationic polymer.

SUMMARY OF THE INVENTION

Briefly stated, the invention in a preferred form is a novel composition of matter, and a method of use, which includes at least a polyaluminum compound in an aqueous solution for use as a coagulant and/or flocculant. The composition of matter additionally includes magnesium and/or calcium and a water-soluble polymeric flocculant.

In general, the material of the invention may be alternately formulated to comprise, consist of, or consist essentially of, any appropriate components herein disclosed. The material of the invention may additionally, or alternatively, be formulated so as to be devoid, or substantially free, of and components, materials, ingredients, or species used in the prior art compositions or that are otherwise not necessary to the achievement of the function and/or objectives of the present invention.

An object of the invention is to be highly effective and incorporate into the flakes that form as completely as possible so that no residue or only minimal residues remain in the purified water.

An object of the invention is to provide high specific charges so that the pollutants in the wastewater are completely removed from the wastewater by means of coagulation or adsorption.

An object of the invention is to promote the growth and metabolism of the microorganism, and not prevent it as is commonly the case with conventional precipitants.

An object of the invention is to allow the use of substantially lower doses of agent than is the case with conventional agents.

An object of the invention is to serve as a ready-to-use composition of matter having a high-storage stability.

An object of the invention is to permit stable long-term operation of the wastewater treatment plants while at the same time having significantly no effect on the load and temperature variations.

An object of the invention is to not contain any flocculants (for example: polyacrylamides) that are suspected of being toxic to fish.

BRIEF DESCRIPTION OF THE DRAWINGS

Other objects and advantages of the invention will be evident to one of ordinary skill in the art from he following detailed description with reference to the accompanying drawings in which.

DETAILED DESCRIPTION OF THE INVENTION

The composition of matter of one embodiment of the invention is an aqueous solution in which a mixture of the contents explained below under A, B, and C is present in dissolved form. Commercially available products may be used for each of these ingredients, in particular in the form of aqueous solutions.

A) A polyaluminum compound as the main component that is selected from the group comprising the following compounds: polyaluminum chloride, polyaluminum sulfate, polyaluminum sulfate chloride, polyaluminum ferrisulfate, polyaluminum ferrisulfate chloride, polyaluminum ferrichloride, polyaluminum sulfate silicate, or a mixture of two or more of these compounds. The preferred polyaluminum compounds of the invention are those that do not contain iron, and the most preferred is polyaluminum chloride. The polyaluminum compound is preferably present in amounts ranging from 6.6 to 10.0 g aluminum, more preferably 7.2 to 9.0 g aluminum per 100 g of the solution (composition of matter).

The degree of oligomerization of the polyaluminum compound in the compositional matter of the invention should lie within the following range (in weight %): monomer 10 to 30%, oligomer 20 to 90%, polymer 10 to 70%, and preferably monomer 16 to 25%, oligomer 60 to 80%, polymer 10 to 40%, and more preferably, monomer approximately 20%, oligomer approximately 70%, polymer approximately 10%. Here, oligomers are considered to be clusters of molecules that contain 2 to 20 aluminum atoms.

One commercially available product form of polyaluminum chloride that is particularly suitable for use in the composition of matter of the invention is the product Alpoclar 200 manufactured by Ausimont S.p.A. in Porto Marghera (Italy). This product is an aqueous solution of polyaluminum chloride in a concentration corresponding to 17 to 18 wt. % Al, measured as $Al_2O_3$, and 21 to 22.4 wt. % chloride ions. The solution has a density of 1.37 to 1.41 g/ml, a pH at 20° C. of 0.4 to 0.8, and a viscosity at 20° C. of 40 to 80 cPs.

B) A magnesium compound that in aqueous solution forms an acid or at least neutral anion. The preferred compound of the invention is magnesium chloride. The compound should be present in amounts corresponding to 2.0 to 20 weight parts, preferably 10 to 12 weight parts magnesium per 100 weight parts aluminum. The concentration of the magnesium chloride in the composition of matter is 0.1 to 7 g, preferably is 0.1 to 2.0 g, more preferably 0.2 to 1.3 g, and even more preferably 0.75 to 1.0 g magnesium per 100 g of the composition. A suitable commercially available product is $MgCl_2.6H_2O$, which is sold by Merck as article no. 5833 and which can be dissolved by being mixed in the same amount by weight of $H_2O$ to produce a 23% magnesium chloride solution.

The magnesium compound may be completely or partially replaced by a calcium compound, provided that this calcium compound forms an acid or at least neutral anion. Basic magnesium and/or calcium compounds, in particular those in the form of carbonate, hydroxide, or oxide cannot be used for the composition of matter of the invention. In the preferred embodiment of the composition of matter of the invention, the composition only contains magnesium, and not calcium.

C) One or more organic, water-soluble polymeric coagulants or flocculants selected from the group comprising the polyamines, polyDADMAC, polyethylenimine acetates, and polyethylene amines. The total amount of the flocculent lies in the range of from 3.0 to 60 parts by weight, preferably from 20 to 25 parts by weight per 100 parts by weight aluminum. The concentration of the flocculent or flocculants in the final composition of matter preferably lies in the range from 0.3 to 10 g, more preferably from 1.5 to 4.5 g, and most preferably from 1.5 to 2.0 g per 100 g of the solution. If a number of different organic flocculants are used, they should be present in approximately equal parts by weight or concentrations. Suitable commercially available products are the following:

C1: Coagulant CO 501 manufactured by AcqueNYMCO S.p.A. in Cormano (Italy). This is a 38 to 41% aqueous solution of a polyamine that has a density of 1.12 to 1.16 kg/L, a pH of 4 to 7, and a viscosity of 1300 to 2200 cPs. This product is preferably used in an amount in which 100 g of the final composition contains 0.1 to 1.3 g, preferably 0.5 to 0.6 g of the polyamine.

C2: Coagulant CO 502 manufactured by AcqueNYMCO S.p.A in Cormano (Italy). This is a 48 to 51% aqueous solution of a different polyamine that has a density of 1.12 to 1.16 kg/L, a pH of 4 to 7, and a viscosity of 600 to 1000 cPs. This product is preferably used in such an amount that 100 g of the finished composition of matter contains 0.1 to 1.6 g, preferably 0.5 to 0.7 g of the polyamine.

C3: PolyDADMAC (polydiallyldimethylammonium chloride). A suitable commercially available product is the product CO 509 from AcqueNYMcO S.p.A. in Cormano (Italy), which is a 39 to 41% aqueous solution of polyDADMAC copolymer having a density of 1.08 to 1.09 kg/L, a pH of 5 to 7, and a viscosity of 8,000 to 13,000 cPs. The product is preferably used in an amount such that the finished composition contains 0.1 to 1.3 g, in particular 0.5 to 0.6 g, polyDADMAC per 100 g solution.

Preferred in the invention are compositions that contain combinations of two or three of the organic flocculants listed above.

Mainly in the interest in optimal storage stability, the composition of matter of the invention has a pH in the acid to weakly acid range. The pH should be in the range from 0.3 to 4, preferably in the range from 0.7 to 1.5, and most preferably in the range from 0.8 to 1.1.

Figure 1:
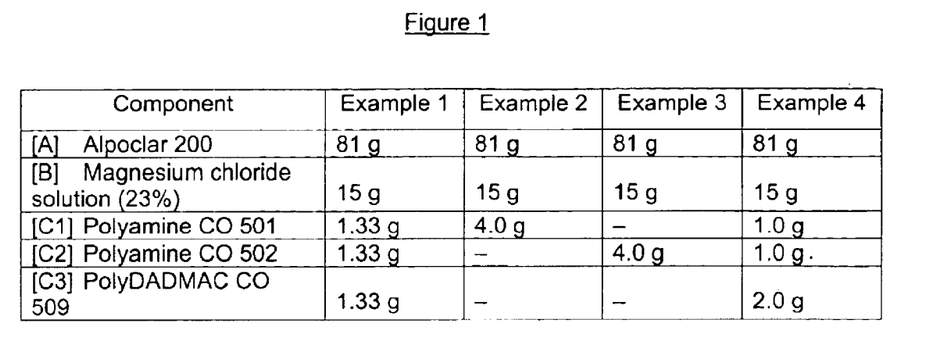
FIG. 1 is a table of various illustrative formulations consistent with the present invention.

Illustrative mixtures of one embodiment of the invention listed in the FIG. 1 table were prepared on a laboratory scale from the starting materials shown in the table. The starting materials included material selected from Alpoclar 200, magnesium chloride solution (23%), polyamine CO 501, polyamine CO 502, and polyDADMAC CO 509.

The components were mixed at room temperature using a slowly turning stirrer in order to obtain 100.0 g of the finished composition. Mixing was performed in such a way that no air bubbles were incorporated into the solution at any phase, and long enough to ensure that all components were dissolved and the product was completely clear and free of striations.

Figure 2:
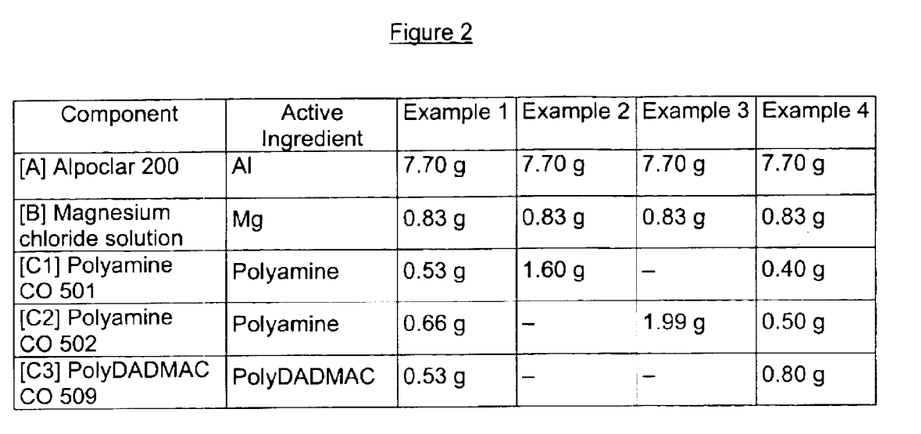
FIG. 2 is a table of the various illustrative formulations of FIG. 1, in particular, the active constituents consistent with the present invention.

FIG. 2 shows the amounts of the active ingredients contained in the 100 g of the product described above with regard to FIG. 1.

Using these various examples of the compositions consistent with the present invention, flocculation and sedimentation tests were performed in the laboratory as follows:

One liter of activated sludge from the activation basin of a wastewater treatment plant was placed in a 1-liter graduated cylinder (diameter 6 cm, height 35 cm), and one drop of the composition of the invention was added to it using a pipette. After rapid and complete mixing (turning the graduated cylinder 180° three times), the sedimentation of the sludge was measured 1, 2, 3, and 5 minutes after the beginning of the test, and was compared to the results of a blank sample without the addition of the composition of the invention. The following variables were observed in the first two minutes:

1. Sedimentation rate (height of the sludge level).
2. Completeness of flake agglomeration (presence or absence of microflakes on the surface of the water or in the supernatant liquid).
3. Completeness of coagulation (cloudiness in the supernatant liquid: yes/no).

It was found that all examples of the embodiments of the composition consistent with the present invention exhibited a markedly higher sedimentation rate in the first two minutes compared to the blank sample, a markedly lower occurrence of microflakes on the water surface or in the supernatant liquid, and a virtually non-existent residual cloudiness in the supernatant liquid.

Based on the positive results of the laboratory tests, the composition of the invention was evaluated in pilot tests in a number of wastewater treatment plans. The wastewater treatment plants had previously been operated using iron chloride as the conventional precipitating agent. In order to make the change to the pilot test using the composition of the invention, the addition of the conventional precipitating agent was discontinued and replaced with the addition of a composition of the invention.

Figure 3:
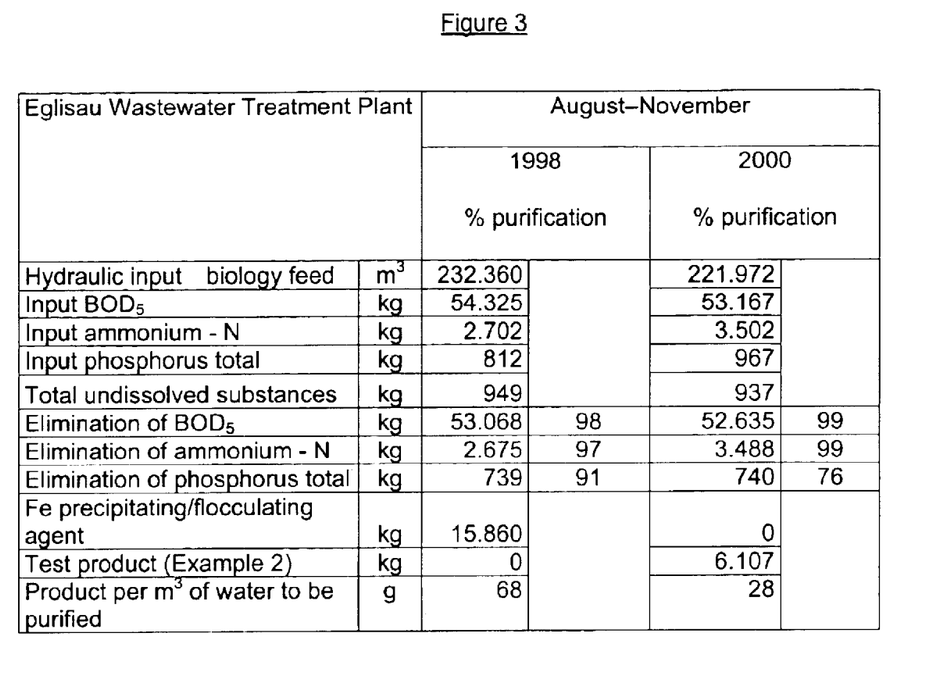
FIG. 3 is a table of test results from the Eglisau Wastewater Treatment Plant.
Figure 4:
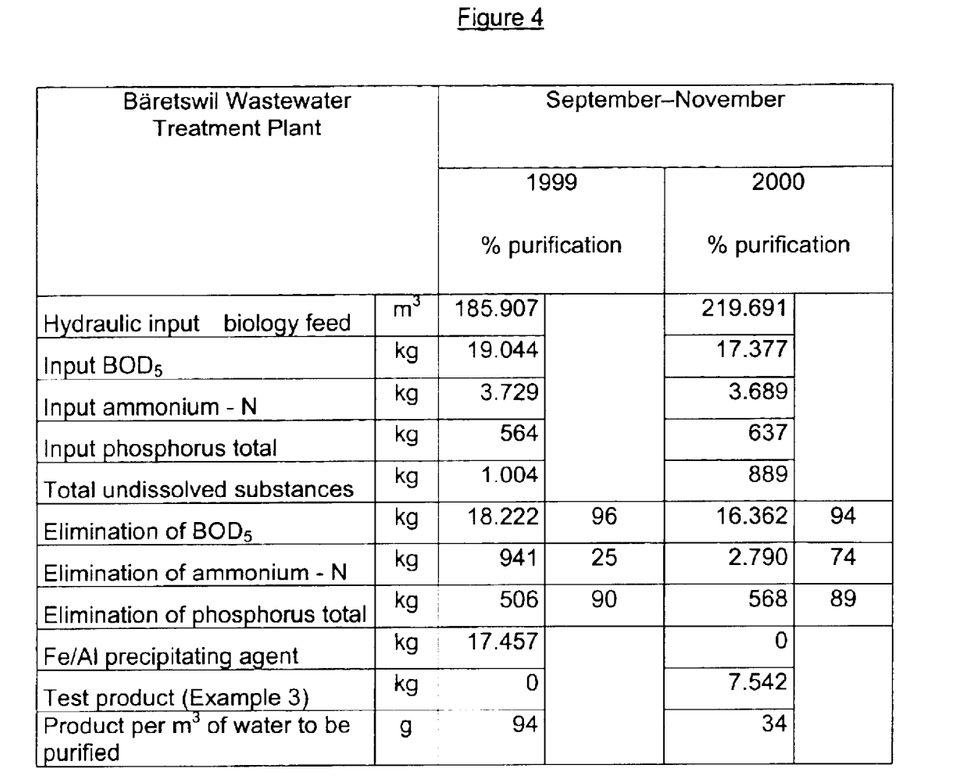
FIG. 4 is a table of test results from the Bäretswil Wastewater Treatment Plant.
Figure 5:
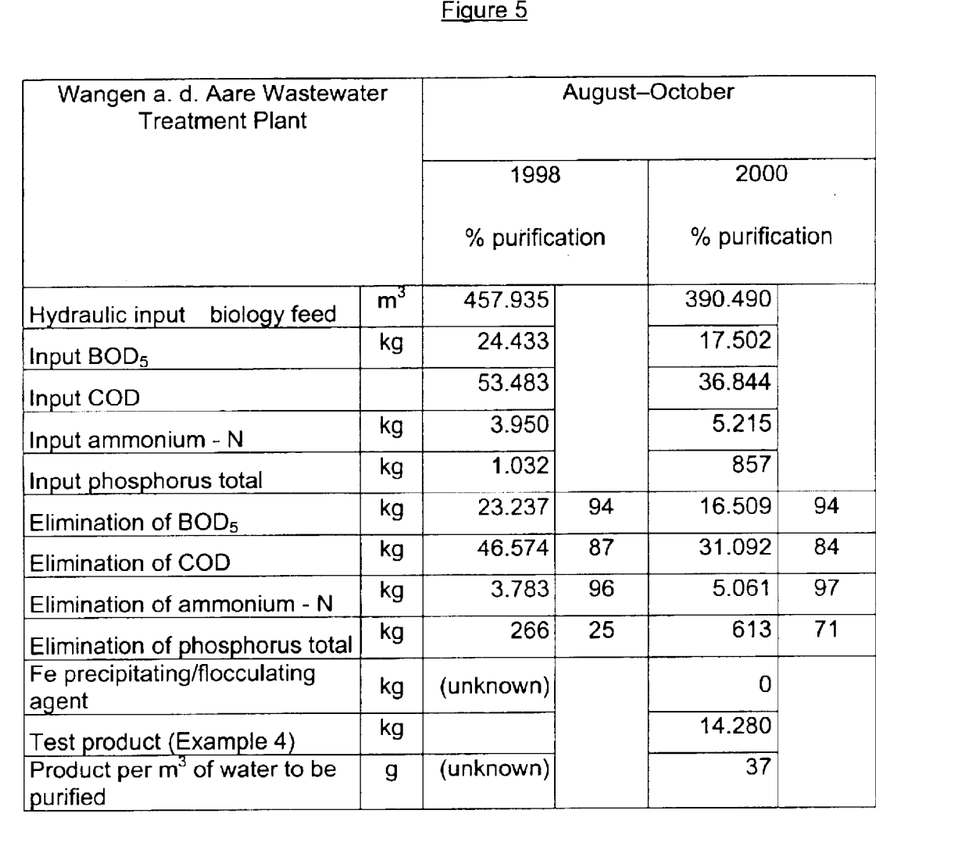
FIG. 5 is a table of test results from the Wangen a. d. Aare Wastewater Treatment Plant.

Three of the pilot tests were performed using the compositions referred to in FIG. 1 as Examples 2, 3, and 4 in wastewater treatment facilities in Eglisau, Bäretswil, and Wangen (Switzerland), respectively. FIGS. 3, 4, and 5 each show a comparison of the results that were achieved with the conventional precipitating agent (iron chloride) in 3 months in 1998 with the same three months of 2000 using the composition of the invention.

FIGS. 3 through 5 show that, using an amount of the composition consistent with the present invention, amounted only to a fraction of the amount of the previously used Fe precipitating agent, equally good purification performance was achieved with regard to the elimination of BOD, COD, and ammonia, as well as a significantly improved phosphorus elimination were achieved.

After completion of the pilot tests performed using examples 2, 3, and 4 (and additional variants), and after it was found that stable operation of the treatment plant was possible following the change to the composition of the invention (stable flocculation and sedimentation), as part of further optimization of test operation in the treatment plants, a change was made to the composition of Example 1 in FIG. 1, and its rates of addition were reduced to 5 from 20 g/m$^3$.

All pilot tests in the wastewater treatment plants achieved the following results:

1. The sludge flake is larger and more stable than that achieved with iron precipitating agents, and it absorbs the particulates at a virtually quantitative rate.

2. The sludge flake sediments reliably and is also able to co-sediment filamentous bacteria. This is not possible with conventional precipitating agents.

3. The flake structure is such that the dry substance content (dry weight of the biomass) in the activated sludge basin can be varied between values of <1 g/L to 6 g/L activated sludge as desired when the waste treatment plant is in normal operation. This allows the plant to be adjusted more effectively to the desired purification performance than had been possible with conventional formulations.

4. For biological processes, the flocculation is so non-aggressive that the species diversity in the activated sludge is significantly higher than it would be compared with conventional formulations.

5. Sedimentation is so reliable that even sudden high hydraulic loads in which three times as much water was added did not cause any sludge to be driven off.

6. The effectiveness of the products remains virtually unchanged during cold periods—in other words, the addition rate does not need to be increased, nor do operating settings need to be modified.

7. The rate of addition of the composition of the invention has subsequently been reduced to 5 to 15 ppm without any decrease in the purification performance of the wastewater treatment plants.

The compositions of matter recited above, specifically in FIGS. 1 and 2, have the advantage that they are in an optimal, ready-to-use concentration and can be filled into containers, delivered, stored, and used in the waste treatment plant in undiluted form. Of course, it is also possible to prepare compositions of the invention in other concentrations, for example in lower concentrations, or to dilute them before using them in the wastewater treatment plant.

While the preferred embodiments have been shown to describe the invention, various modifications and substitutions may be made thereto without departing from the spirit and scope of the invention. Accordingly, it is to be understood that the present invention has been described by way of illustration and not limitation.

What is claimed:

1. A composition of matter comprising an aqueous solution containing the following dissolved components:

a) at least one polyaluminum compound selected from the group consisting of polyaluminum chloride, polyaluminum sulfate, polyaluminum sulfate chloride, polyaluminum sulfate silicate, polyaluminum ferrisulfate, polyaluminum ferrisulfate chloride, and polyaluminum ferrisulfate, the amount of polyaluminum compound corresponding to 6.6 to 10 weight parts aluminum;

b) 0.1 to 7 weight parts magnesium, calcium, or magnesium and in the form of a compound that forms a neutral or acid anion; and c) 0.3 to 10 weight parts of one or more organic, water-soluble polymeric flocculants selected from the group consisting of the polyamines, polydiallyldimethylammonium chloride (polyDADMAC), polyethylenimine acetates, and polyethylenimines, where the weight parts are based on 100 weight parts of the composition, and wherein the composition contains 2.0 to 20 parts magnesium and 3.0 to 60 weight parts polymeric flocculants based on 100 weight parts aluminum, and has a pH range of 0.3 to 4.

2. The composition of matter of claim 1, wherein the polyaluminum compound is polyaluminum chloride.

3. The composition of claim 1 having 0.2 to 7 weight parts magnesium chloride, or magnesium chloride and calcium chloride.

4. The composition of matter of claim 1 wherein said composition does not contain any calcium.

5. The composition of matter of claim 1, wherein said composition contains 10 to 12 weight parts magnesium and 20 to 25 weight parts organic flocculant, based on 100 weight parts aluminum.

6. The composition of matter of claim 5, wherein said composition contains the following organic flocculants, based on 100 g of the composition:

0.1 to 1.3 g of a first polyamine;

0.1 to 1.6 g of a second polyamine; and 0.1 to 1.3 g polyDADMAC.

7. The composition of matter of claim 6, wherein said composition contains the following organic flocculants, based on 100 g of the composition:

0.5 to 0.6 g, of a first polyamine;

0.6 to 0.7 g, of a second polyamine; and 0.5 to 0.6 g, polyDADMAC.

8. The composition of matter of claim 1, wherein said composition contains as an organic flocculant at least two different quaternary polyamines having different molecular weights, different viscosities, or different molecular weights and different viscosities.

9. The composition of matter of claim 1, wherein said composition contains as an organic flocculant at least one quaternary polyamine and polyDADMAC.

10. The composition of matter of claim 1, wherein said composition contains the following amounts of dissolved substances per 100 g of the composition of matter:

7.0 to 9.5 g aluminum in the form of polyaluminum chloride;

0.1 to 1.3 g magnesium in the form of magnesium chloride; and 0.3 to 4.5 g organic flocculant.

11. The composition of matter of claim 10, wherein said composition contains the following amounts of dissolved substances per 100 g of the composition of matter:

7.5 to 8 g, aluminum in the form of polyaluminum chloride;

0.75 to 1.0 g magnesium in the form of magnesium chloride; and 1.5 to 2.0 g, organic flocculant.

12. The composition of matter of claim 1, wherein the polyaluminum compound has an oligomerization in the weight percentage ranges of;

10% to 30% monomer;

20% to 90% oligomer; and

10% to 40% polymer.

* * * * *

UNITED STATES PATENT AND TRADEMARK OFFICE
CERTIFICATE OF CORRECTION

PATENT NO. : 6,929,759 B2  Page 1 of 1
APPLICATION NO. : 10/808705
DATED : August 16, 2005
INVENTOR(S) : Früh et al.

It is certified that error appears in the above-identified patent and that said Letters Patent is hereby corrected as shown below:

<u>Column 7</u>:

Line 4, delete "ferrisulfate" and substitute --ferrichloride--.

Line 6, delete "calcium".

Line 7, after "and" insert --calcium--.

Signed and Sealed this

Nineteenth Day of December, 2006

JON W. DUDAS
*Director of the United States Patent and Trademark Office*